United States Patent [19]
Braat

[11] Patent Number: 5,926,450
[45] Date of Patent: Jul. 20, 1999

[54] DEVICE FOR OPTICALLY SCANNING RECORD CARRIERS OF DIFFERENT THICKNESSES

[75] Inventor: Josephus J. M. Braat, Eindhoven, Netherlands

[73] Assignee: U.S. Philips Corporation, New York, N.Y.

[21] Appl. No.: 08/812,193

[22] Filed: Mar. 6, 1997

Related U.S. Application Data

[63] Continuation-in-part of application No. 08/615,931, Mar. 14, 1996, Pat. No. 5,708,638.

[30] Foreign Application Priority Data

Mar. 15, 1995 [EP] European Pat. Off. ............... 95200619
Jul. 5, 1996 [EP] European Pat. Off. ............... 96201832

[51] Int. Cl.⁶ ............................................. G11B 7/00
[52] U.S. Cl. ............................ 369/58; 369/112; 369/118
[58] Field of Search ................... 369/44.14, 44.23–44.24, 369/44.29, 54, 58, 112, 117–118

[56] References Cited

U.S. PATENT DOCUMENTS

| | | | |
|---|---|---|---|
| 4,358,200 | 11/1982 | Keemskerk et al. | 369/44.23 X |
| 5,446,565 | 8/1995 | Komma et al. | 369/44.23 |
| 5,665,957 | 9/1997 | Lee et al. | 369/44.24 X |
| 5,708,638 | 1/1998 | Braat et al. | 369/112 |

*Primary Examiner*—W. R. Young
*Attorney, Agent, or Firm*—F. Brice Faller

[57] ABSTRACT

An optical scanning device can scan two types of record carriers each having a transparent layer with a different thickness, in which a focused radiation beam scans an information layer of the record carrier through the transparent layer. When scanning a first type of record carrier the best focus of the radiation beam is positioned on the information layer and when scanning a second type of record carrier the paraxial focus of the radiation beam is positioned on the information layer. The lens system focusing the radiation beam comprises an opaque ring between a transparent central area and a transparent annular area.

9 Claims, 2 Drawing Sheets

DEVICE FOR OPTICALLY SCANNING RECORD CARRIERS OF DIFFERENT THICKNESSES

This application is a continuation-in-part of U.S. application Ser. No. 08/615,931 filed on Mar. 14, 1996, now U.S. Pat. No. 5,708,638.

BACKGROUND OF THE INVENTION

The invention relates to an optical scanning device for scanning a first type of record carrier having a first information layer and a first transparent layer of a first thickness and for scanning a second type of record carrier having a second information layer and a second transparent layer of a second thickness different from the first thickness. The device includes a radiation source for generating a radiation beam and a lens system designed for converging the radiation beam through the first transparent layer to a focus on the first information layer. The invention also relates to a method for optically scanning a record carrier of the first or second type. The scanning includes writing, reading and/or erasing information in the record carrier.

The transparent layer in optical record carriers has, in general, the function of protecting the information layer from environmental influences and providing mechanical support for the record carrier, i.e. it acts as a substrate for the information layer. The thickness of the transparent layer is a compromise between the desired stiffness of the record carrier and the numerical aperture of the radiation beam used for scanning the information layer. If for a new type of record carrier the numerical aperture is increased in order to increase the storage density of the information layer, it is often necessary to reduce the thickness of the transparent layer in order to reduce the influence of disc tilt on the quality of the radiation beam. As a consequence, there will be different types of record carrier on the market, having different thicknesses of the transparent layer. A compatible record player should be able to scan the different types of record carrier, irrespective of the thickness of the transparent layer.

The transparent layer, through which a radiation beam scans the information layer, introduces a so-called spherical aberration in the radiation beam. The spherical aberration may be compensated in the lens system, making the radiation beam near its focus substantially free from spherical aberration. If a lens system compensated for a first thickness of the transparent layer is used for scanning a record carrier with a transparent layer of a second, different thickness, the quality of the focus will be deteriorated due to the under- or over-compensated spherical aberration.

The PCT application IB96/00182 to which Braat et al. U.S. 5,708,638 corresponds, describes a device for scanning optical record carriers of the first and second type. This device uses a lens system designed for converging a radiation beam through the first transparent layer to a best focus on the first information layer. When scanning a record carrier of the second type, the lens system forms a paraxial focus on the second information layer. The best focus of a beam is the point along the axis of the beam which has the highest intensity. The paraxial focus of a beam is the point along the axis of the beam through or towards which the paraxial rays of the beam are converged. The radiation reflected from the record carrier is detected by a radiation-sensitive detection system. When scanning a record carrier of the first type, the detection system uses all radiation in the reflected beam or the radiation in an outer annular area of the cross section of the reflected beam. When scanning a record carrier of the second type, the detection system detects only radiation from a central area of the cross section of the radiation beam. Since the lens system is not designed for converging a radiation beam through the thickness of the second transparent layer, the radiation beam will incur uncorrected spherical aberration on passage through the second transparent layer. By restricting the detection to the rays in a central area of the beam, the highly aberrated rays in the outer annular area of the beam will then have a reduced influence on the output signals of the detection system.

SUMMARY OF THE INVENTION

According to a first aspect of the invention the optical scanning device is designed for scanning a first type of record carrier having a first information layer and a first transparent layer of a first thickness and for scanning a second type of record carrier having a second information layer and a second transparent layer of a second thickness different from the first thickness. The device includes a radiation source for generating a radiation beam and a lens system designed for converging the radiation beam through the first transparent layer to a focus on the first information layer, a detection system arranged in a radiation beam reflected from the record carrier, an opaque ring arranged in the optical path between the radiation source and the detection system, and (means for positioning the best focus of the radiation beam substantially on the first information layer and the paraxial focus of said radiation beam substantially on the second information layer.

In general, the ring is concentric with the above-mentioned annular and central area and forms an intermediate area in between the central area and the outer annular area in a cross section of the radiation beam. The ring may be arranged in a ring-shaped area separating the annular area and the central area of the lens system.

When the lens system converges a radiation beam through the first transparent layer, the rays in the annular area or in the combined area of the annular area and the central area of the beam are corrected for the spherical aberration incurred in passing the first transparent layer and form the best focus. The means for positioning, such as a focus servo system, use information comprised in the rays in at least the annular area to position the best focus on the information layer.

When the lens system converges a radiation beam through the second transparent layer, the rays in the central area of the beam form the paraxial focus. The means for positioning use information comprised in the rays in the central area to position the paraxial focus on the information layer. The rays in the annular area have a large angular deviation because of the uncompensated spherical aberration. Therefore, after reflection from the record carrier these rays can be made not to be intercepted by the relatively small detection system and not affect the electrical signals formed by the detection system. However, rays in an intermediate region between the central area and the annular area will have a relatively small deviation and still be incident on the detection system although these rays do not have the proper spherical aberration correction for the second type of record carrier, thereby lowering the quality of the detection signals formed by the detection system.

This problem is solved by providing the scanning device according to the invention with an opaque ring in the optical path between the radiation source and the detection system. The word 'opaque' means that light incident on the ring does not follow the path it would have followed in the absence of the ring, i.e. such light does not fall on the detection system anymore. When the ring is arranged in both the forward radiation beam and the reflected beam, the electric signals generated by the detection system are less affected by the lateral motion of the objective lens system. The ring may then be arranged on the lens system. When the ring is arranged in the reflected beam only, the scanning device will have an improved tolerance for tilt of the record carrier.

It is remarked that the European patent application nr. 0 610 055 to which Komma et al. U.S. 5,446,565 corresponds, discloses a lens system combined with a hologram or grating. The lens is corrected over its entire area for the passage of radiation through a first transparent layer thickness towards a first focus. The grating diffracts part of the radiation in a central area of the incoming radiation beam into a sub-beam which, after refraction by the lens, is corrected for passage through a second transparent layer thickness towards a second focus. The lens system and grating converges the radiation beam to a beam comprising two sub-beams having different vergences. Hence, the combination of the lens system and the grating forms two best foci. In contrast, the lens system according to the invention converges the radiation beam to a beam having a single vergence and forms a single best focus. When the lens system according to the invention is of a refractive-only type, a reflective-only type or a refractive-reflective-only type, it also passes substantially all energy of the incident radiation beam to the first focus, and does not branch off part of the energy to a sub-beam forming the second focus. The phrase 'substantially all energy of the radiation beam' means that only normal losses due to reflections on transitions from one medium into another one, due to absorption within media and due to opaque parts of the lens are disregarded.

According to a second aspect of the invention a method for optically scanning a first type of record carrier having a first information layer and a first transparent layer of a first thickness and a second type of record carrier having a second information layer and a second transparent layer of a second thickness different from the first thickness, comprising the step of converging a radiation beam by means of a lens system through the first transparent layer to a best focus substantially on the first information layer when scanning a record carrier of the first type, the step of converging the radiation beam by means of the lens system through the second transparent layer to a paraxial focus substantially on the second information layer when scanning a record carrier of the second type, the step of converging radiation reflected from the record carrier to a detection system, and the step of preventing part of the reflected beam from reaching the detection system by an opaque ring arranged in the optical path between the radiation source and the detection system.

BRIEF DESCRIPTION OF THE DRAWING

FIG. 1A shows a device for scanning an optical record carrier 1 of a first type. The record carrier comprises a transparent layer 2, on one side of which an information layer 3 is arranged. The side of the information layer facing away from the transparent layer is protected from environmental influences by a protection layer 4. The transparent layer 2 acts as a substrate for the record carrier by providing mechanical support for the information layer. Alternatively, the transparent layer may have the sole function of protecting the information layer, while the mechanical support is provided by a layer on the other side of the information layer, for instance by the protection layer 4 or by a further transparent layer and information layer connected to the information layer 3. Information may be stored in the record carrier in the form of optically detectable marks arranged in substantially parallel, concentric or spiral tracks in the information layer 3, not indicated in the Figure. The marks may be in any optically readable form, e.g. in the form of pits, areas with a reflection coefficient or a direction of magnetization different from their surroundings, or a combination of these forms.

Figure 1B:
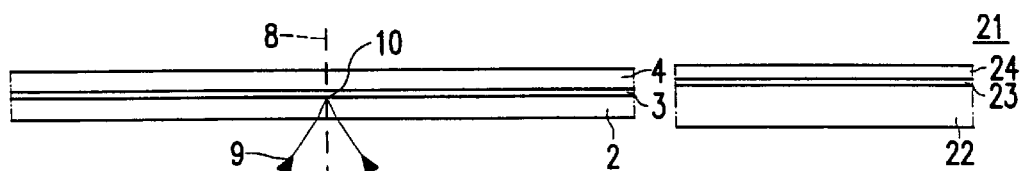
FIG. 1B shows a record carrier of the second type.

The scanning device comprises a radiation source 5, for example a semiconductor laser, emitting a diverging radiation beam 6. A beam splitter 12, for example a semitransparent plate, reflects the radiation towards a lens system. The lens system comprises a collimator lens 7' and an objective lens 7. The collimator lens 7' forms a collimated beam, which is incident on a single-focus objective lens 7. The collimator lens and the objective lens may be combined in a single objective lens. The lens system 7', 7, having an optical axis 8, transforms the radiation beam 6 to a converging beam 9, having a single vergence, which forms a focus 10 on the information layer 3. Although the objective lens is indicated in the Figure as a single lens element, it may also comprise a hologram operating in transmission or reflection, or a grating for coupling radiation out of a waveguide carrying the radiation beam. Radiation of the converging beam 9 reflected by the information layer 3 and forming a reflected beam 11, returns on the optical path of the forward converging beam 9. The lens system 7, 7' converges the reflected beam 11 to a converging reflected beam 13 and the beam splitter 12 separates the forward and reflected beams by transmitting at least part of the reflected beam 13 towards a detection system 14. The detection system captures the radiation and converts it into one or more electrical signals. One of these signals is an information signal 15, the value of which represents the information read from the information layer 3. Another signal is a focus error signal 16, the value of which represents the axial difference in height between the focus 10 and the information layer 3. The focus error signal is used as input for a focus servo controller 17, which controls the axial position of the objective lens 7, thereby controlling the axial position of the focus 10 such that the focus substantially coincides with the plane of the information layer 3. The part of the detection system, including one or more radiation-sensitive detection elements and an electronic circuit processing the output signal of the detection elements, used for generating the focus error is called the focus error detection system. The focus servo system for positioning the lens system comprises the focus error detection system, the focus servo controller and an actuator for moving the lens system.

Figure 2:
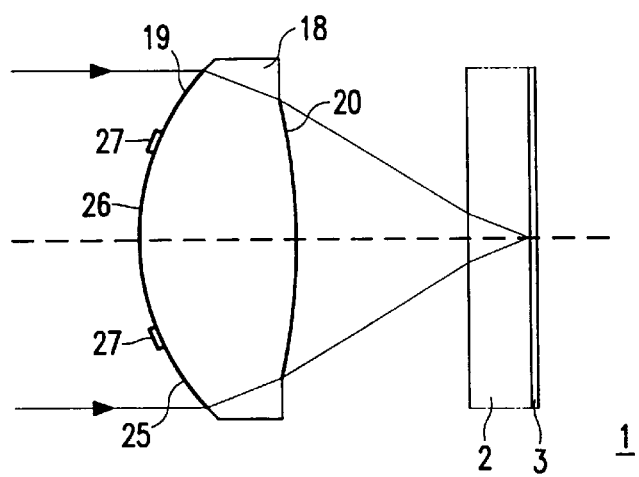
FIG. 2 shows a cross-section of an objective lens provided with an opaque ring.

FIG. 2 shows a cross-section of an embodiment 18 of the objective lens 7. The objective lens has a numerical aperture of 0.6. The lens may be a biaspheric and made of a single plastic material for instance by injection moulding. The material of the lens is Polymethyl-methacrylate (PMMA) having a refractive index of 1.4885 at the design wavelength of 650 nm. The data of the lens are:

| | |
|---|---|
| focal length | 3.30 mm |
| thickness on the optical axis | 2.95 mm |
| optical diameter | 3.96 mm |
| free working distance | 1.5 mm. |

The lens has two surfaces 19 and 20, the first surface facing the radiation source, the second surface 20 facing the record carrier 1. The shape of the surface 19 is given by the polynomial $$z = \sum_{n=1}^{n=5} a_{2n} y^{2n} \qquad (1)$$

where the constants have the values: $a_2$=0.25317630, $a_4$=0.00671352, $a_6$=0.00045753, $a_8$=−0.00010526 and $a_{10}$=0.00000860. The shape of the surface 20 over the width of the radiation beam is given by equation (1) in which the constants have the values: $a_2$=−0.10009614, $a_4$=0.02163729, $a_6$=−0.00788082, $a_8$=0.00205921 and $a_{10}$=−0.00023477.

The lens system 7, 7' has been designed to form an optimum focus on the information layer 3, i.e. a focus with a Strehl ratio approaching 1. For this reason the lens system has been corrected over its entire cross-section, i.e. in its central and annular area, for the spherical aberration incurred by the converging beam 9 when passing the transparent layer 2 of the record carrier 1. The wavefront of the converging beam close to the focal spot 10 is substantially spherical. FIG. 1B shows a record carrier 21 of a second type having an information layer 23 and a transparent layer 22 of a thickness different from the thickness of the transparent layer 2. When the same device is used for scanning this record carrier, the lens system 7, 7' will not be corrected properly for the transparent layer 22. The focus servo controller 17 will adjust the position of the objective lens 7 such that the average deviation of the wavefront of the beam near the information layer 23 from a spherical shape has a minimum value over the cross-section of the beam. The remaining spherical aberration at the position of the information layer results in a wavefront strongly undulating over the entire aperture, which causes the focal spot to be strongly aberrated. Such a focal spot is less suitable for scanning the record carrier 21.

However, the information layer 23 may be scanned properly by means of the converging beam 9 when the information layer is arranged axially not at the position of the best focus but near the position of the paraxial focus. In a small range around the position of the paraxial focus the wavefront of the aberrated converging beam is substantially spherical in a central area of the aperture. The focal spot comprises a small, central region of high intensity resulting from rays in the central area of the aperture, and a large region of low intensity surrounding the small region and resulting from rays outside the central area. The quality of the central region of the focal spot is then sufficient for properly scanning the information layer 23, while the outer region can be made not to affect the scanning.

Figure 3:
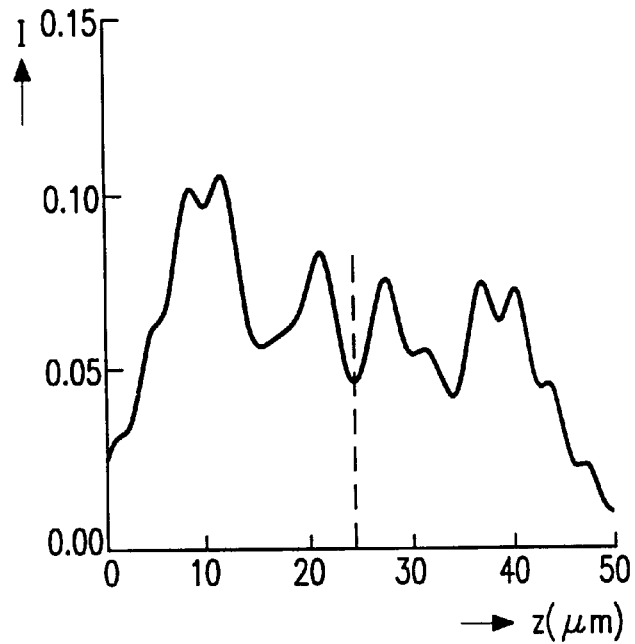
FIG. 3 shows the radiation intensity along the optical axis when scanning a record carrier of the second type.

FIG. 3 shows the radiation intensity along the optical axis of the objective lens 7 when scanning a record carrier of the second type for the case that the record carrier of the second type has a substrate which is 0.6 mm thicker than the substrate of the record carrier of the first type. The vertical axis shows the normalized radiation intensity I of the converging beam 9 and the horizontal axis shows the distance z from the paraxial focus away from the lens system, measured in micrometers. The best focus, which point along the optical axis a scanning device would normally position on the information layer 23, is located 24 μm away from the paraxial focus, as indicated in the Figure by a vertical, dashed line. Each local maximum of the curve in the Figure corresponds to a location where the radiation of the converging beam is concentrated in a small region near the optical axis. At most locations along the horizontal axis the intensity distribution of the spot in a plane perpendicular to the optical axis shows rings having a relatively strong intensity around the optical axis or a high, relatively flat background intensity, both of which disturb the scanning of the information layer. In a small region around z equal to 6 μm the rings are virtually absent and the background level is strongly reduced. When the information layer 23 is arranged at this position along the optical axis, the layer can be scanned properly. It is to be noted that this preferred position does not necessarily correspond to a maximum in the intensity along the optical axis. If the substrate of the second type of record carrier is thinner than the substrate of the first type of record carrier, the intensity along the optical axis follows a curve similar to the one shown in FIG. 3, but with the best focus position closer to the lens system than the paraxial focus position.

The preferred position of the information layer 23 depends on the thickness difference between the two transparent layers 2 and 22 and on the numerical aperture of the beam 9 in a way shown below. When the information layer 23 is positioned at an axial location away from the preferred position, the quality of the focal spot reduces rapidly, leading to a reduced quality of the signals generated in the detection system 14. Any reference to the position of the paraxial focus herein below is supposed to be a reference to the preferred position.

The flattening of the central area of the wavefront when scanning the information layer 23 of record carrier 21 is accompanied by an increase in the deviation of the outer part of the wavefront. Therefore, the marginal rays in the outer part of the aperture come to a so-called marginal focus which is relatively far removed from the paraxial focus. The best focus of the aberrated beam is in between the paraxial and the marginal focus. The relatively large distance between the paraxial and marginal focus makes it possible to intercept the marginal rays before detection, thereby removing a major part of the disturbing influence of the uncompensated spherical aberration from the signals generated by the detection system. It is to be noted that the paraxial, best and marginal focus coincide when scanning record carrier 1.

In the device according to the invention measures are taken to ensure that the best focus is positioned at the information layer 3 of record carrier 1 and the paraxial focus is positioned at the information layer 23 of record carrier 21. To that end, the cross-section of the reflected beam 13 is divided in two areas, i.e. a central area and an annular area surrounding the central area. When scanning a record carrier of the first type, all rays of the beam in the central and annular area are coming from the best focus. When scanning a record carrier of the second type, the rays in the central area are mainly coming from the paraxial focus and the rays in the annular area are marginal rays not coming from the paraxial focus. The same central and annular areas can be indicated in the forward beams 6 and 9. The measures entail that the focus servo system uses information comprised in the rays in at least the annular area of the reflected beam 13 to position the best focus on the information layer of a record carrier of the first type, and uses information comprised in the rays in the central area to position the paraxial focus on the information layer of a record carrier of the second type.

The size of the central area must be chosen such that the information layer of a record carrier of the second type is scanned properly. When the size is made too large, the spherical aberration will affect the quality of the paraxial focus too much. When the size is made too small, the small numerical aperture of the beam in the central area will result in an apparently large paraxial focal spot, making the reading of small details difficult. A compromise may be found by using the following approximate formula for the modulation transfer function (MTF) at the information layer for the paraxial focus:

$$MTF(v) = \frac{2}{\pi}\left[\arccos\left(\frac{v}{v_c}\right) - \frac{v}{v_c}\sqrt{1-\left(\frac{v}{v_c}\right)^2}\right]\left[1 + 2\left(v - \frac{v_c}{2}\right)^2\left(\frac{2}{v_c}\right)^2 \cdot \epsilon - 2\epsilon\right] \quad (2)$$

with $v = 1/p$,
$v_c = 2NA_c/\lambda$,
$\epsilon = 4\pi^2 W_{40}^2/180$,
$W_{40} = \left(\frac{n^2-1}{8n^3}\right)\frac{\Delta d}{\lambda}NA_c^4$ and with $v$ the spatial frequency, p the pitch of the minimum details in the information layer 23 which should be legible, $v_c$ the spatial cut-off frequency, $NA_c$ the numerical aperture of the radiation beam incident on the record carrier and passing through the central area of the beam and $\lambda$ the wavelength of the radiation beam. $W_{40}$ is the spherical aberration in Seidel terms in units of $\lambda$ at the information layer 23 and at the edge of the radiation beam, n is the refractive index of the transparent layer 22 and $\Delta d$ the absolute value of the thickness difference between transparent layers 22 and 2. The left-hand term in square brackets in formula (2) is the MTF of an ideal imaging system, the right-hand term in square brackets is a multiplicative factor taking into account the effect of the spherical aberration in the radiation beam.

The optimum value of $NA_c$ for scanning a record carrier of the second type can be derived from formula (2) by inserting the values for $\lambda$, p, n, $\Delta d$ and finding the value of $NA_c$ which gives the highest value of MTF($v$), for instance by taking the derivative with respect to $NA_c$ of formula (2). The size of the central area is now equal to the size of the entire cross-section of the reflected beam times the value of $NA_c$ over the numerical aperture of the entire reflected beam. As an example, an optical scanning device is designed to scan a record carrier of the first type having a transparent layer thickness of 0.6 mm with a radiation beam of wavelength $\lambda=635$ nm and $NA_0=0.60$, $NA_0$ being the numerical aperture of the entire radiation beam. The device should also be able to scan a record carrier of the second type having a transparent layer thickness of 1.2 mm ($\Delta d=0.6$ mm), refractive index of 1.58 and smallest details in the form of a track pitch having p=1.6 $\mu$m. The optimum value of $NA_c$ is 0.33 and the diameter of the central area is equal to the diameter of the entire cross-section of the reflected beam times 0.55 (=0.33/0.60). The tolerance on the value of $NA_c$ and the size of the central area is relatively large because of the counteracting effects of spherical aberration which increases the spot size with increasing aperture and diffraction which decreases the spot size with increasing numerical aperture. For low performance devices the tolerance is ±25% and for high-performance devices the tolerance is preferably equal to ±10%.

The quality of the scanning spot on the information layer 23 is sufficient for values of $W_{40}$ within the central area up to one wavelength. From the expression for $W_{40}$ in equation (2), one can derive that the numerical aperture $NA_c$ of the converging beam 9 passing through the central area is preferably smaller than or equal to $$NA_c(\max) = \sqrt[4]{\frac{8\lambda n^3}{\Delta d(n^2-1)}} \quad (3)$$

The diameter of the central area in a cross-section of the reflected beam 11 or 13 is preferably smaller than or equal to $NA_c$ (max)/$NA_0$ times the diameter of the entire reflected beam in the plane of the cross-section. $NA_0$ is the numerical aperture of the entire converging beam 9. Using the parameter values of the example in the previous paragraph, this amounts to a maximum value of $NA_c$ equal to 0.39. The corresponding smallest tangential dimension of bits $d_b$ on the information layer which can still be read properly is equal to about $\lambda/(4NA_c)$, i.e. 0.42 $\mu$m bit length for 650 nm wavelength and $NA_c$ equal to 0.39. The preferred value of $NA_c$, i.e. $NA_c$(opt), is obtained when $W_{40}$ is about equal to $\lambda/2$ or $$NA_c(opt) = \sqrt[4]{\frac{4\lambda n^3}{\Delta d(n^2-1)}} \quad (4)$$

When n is equal to 1.58 and $\Delta d$ to 0.6 mm and $\lambda$ to 650 nm, the optimum numerical aperture of the central area is 0.33. The value of $NA_c$ is preferably larger than $\lambda/(4d_b)$ in order to be able to read details on the information layer having a tangential dimension of $d_b$ and larger. When the smallest tangential bit dimension is 0.6 $\mu$m and $\lambda$ is equal to 650 nm, then $NA_c$ is preferably larger than 0.27.

The preferred position of the information layer along the optical axis in FIG. 3 can also be expressed in terms of the parameters of equation (2). The optimum position can be found by setting the defocusing aberration $W_{20}$ equal to $-W_{40}$. The resulting defocusing z away from the paraxial focus is then $$z = \frac{n^2-1}{4n^3}NA_c^2\Delta d \quad (5)$$

When $NA_c$ is equal to 0.33, n is 1.58 and $\Delta d$ equal to 0.6 mm, the defocusing, i.e. the preferred position is 6 $\mu$m away from the paraxial focus. This corresponds to a defocusing of about two focal depths of the central area of the converging beam 9. A reasonable scanning quality can still be obtained when the position is chosen within a range from the preferred position minus half a focal depth of the radiation beam passing through the central area to the preferred position plus half the focal depth. The focal depth is equal to $\lambda/(2NA_c^2)$, which is equal to 3 $\mu$m for the given parameter values, resulting in a range from 4.5 to 7.5 $\mu$m away from the paraxial focus.

The quality of the paraxial focus may be further improved by giving the annular area a spherical aberration correction appropriate for the first transparent layer and the central area a spherical aberration correction appropriate for the second transparent layer. When the objective lens converges a radiation beam through the second transparent layer, the rays of the beam passing through the central area form the paraxial focus, the rays being corrected for the spherical aberration incurred in passing the second transparent layer. When the objective lens converges a radiation beam through the first transparent layer, the beam passing through the combined area of the annular area and the central area forms the best focus. In this case, only the rays passing through the annular area are corrected for the spherical aberration incurred in passing the first transparent layer, whereas the rays passing through the central area are corrected for the spherical aberration incurred in passing the second transparent layer. It turns out that the correction of the central area of the objective lens for a thickness of the transparent layer different from the thickness of the transparent layer for which the annular area is corrected has only a relatively small influence on the quality of the best focus.

In general, a focus is correctly positioned on an information plane if the focus error signal 16 has a zero value. When in a scanning device having an objective lens according to the above first embodiment the focus servo system has been adjusted such that the first focus located on the first information layer 3 is at a zero-crossing of the focus error signal, the second focus is in general not accurately located on the information layer 23 at the zero-crossing of the focus error signal. This can be remedied by adding a constant focus offset voltage to the focus error signal 16 when scanning a record carrier of the second type. The drawback of an offset voltage dependent on the type of record carrier being scanned can be overcome by modifying the objective lens. Thereto a focus correction is preferably added to the central area of the objective lens, giving the central area a focus correction different from the correction appropriate for the spherical aberration it introduces in the beam. The extra focus correction takes care that the second focus is located on the second information layer at a zero-crossing of the focus error signal. The magnitude of the extra focus correction is of the order of a focal depth of the objective lens, i.e. of the order of 1 $\mu$m, and may depend on the geometry of the focus error detection system. The record-carrier-dependent additional focus offset voltage is then no longer necessary.

As stated above, the marginal rays of the radiation beam 13 must be intercepted before detection when scanning a record carrier of the second type. Rays in the central area of the radiation beam 13 will be converged properly towards the detection system 14, whereas the marginal rays of the radiation beam 13 in the annular area have such a large angular deviation due to the spherical aberration, that they will not be intercepted by the detection system 14. However, rays in an intermediate region between the central region of the beam and the marginal rays will still be incident on the detection system although these rays do not have the proper spherical aberration correction for the first type of record carrier, thereby lowering the quality of the detection signals formed by the detection system.

This problem is solved by providing the scanning device with an opaque ring, which may be arranged on the lens system. The width and position of the ring must be such that it intercepts the above-mentioned rays in the intermediate region. The word 'opaque' means that light incident on the ring does not follow the path it would have followed in the absence of the ring, i.e. such light does not fall on the detection system anymore.

Figure 4:
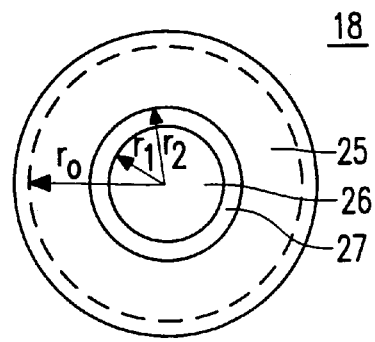
FIG. 4 shows a front view of the objective lens of FIG. 2.

FIG. 2 shows a cross-section of the objective lens 18 having such an opaque ring. An annular area 25 and a central area 26 are separated by an intermediate annular ring 27. FIG. 4 shows a front view of the objective lens 18 and the ring 27. The arrow $r_0$ indicates the radius of the entire radiation beam 11 at the location of the ring, corresponding to the numerical aperture $NA_0$. The arrows $r_1$ and $r_2$ indicate the preferred radii of the inner and outer circle respectively of the ring 27. The inner circle has a radius which lies in a range of $0.75r_1$ to $1.25r_1$. The size of $r_1$ is preferably such that the inner circle is located at the position of the outer bounding circle of the central area, corresponding to the numerical aperture $NA_c$, with a tolerance of ±10% of the value of $r_0$. The width of the ring depends amongst others on the geometry of the detection system 14. A wide ring effectively removes unwanted rays from the detection system, whereas a small ring has a higher throughput of radiation. As a compromise, a ring arranged in the forward and reflected radiation beam has preferably a width $r_2-r_1$ between 5% and 25% of the value of $r_0$ and has an optimum width of 10% of the value of $r_0$.

The preferred value of the radius $r_1$ of the ring may be derived from equation (4) taking $r_1/r_0 = NA_c/NA_0$:

$$r_1 = \frac{r_0}{NA_0} \sqrt[4]{\frac{4\lambda n^3}{\Delta d(n^2 - 1)}} \qquad (6)$$

The ring may have one of several embodiments. It may comprise one ore more deep 'V' grooves or hills parallel to or perpendicular to the inner circle of the ring, which refract the incident light on the ring in directions where they hardly or not at all affect the detection signals anymore. The ring may also comprise a series of small, shallow pits or grooves operating as a grating which diffracts the incident light away from the ongoing beam. Such a grating can easily be applied to a lens made tip of a glass body and a transparent layer covering one or both sides of the body and to a plastic lens. The ring may comprise a reflective thin film coating for reflecting light incident on the ring. The ring may also comprise an absorbing layer of a material such as ink to absorb incident light. The ring may comprise $2(2n+1)$ sections of equal length, where $n=0, 1, 2, \ldots$, and sections are alternately transparent and opaque. Such a ring, operating on the way forth and back, forms an effective obstruction for radiation incident on the ring, and at the same time has the advantage that it passes more radiation diffracted in higher orders by the record carrier than a uniformly opaque ring.

Figure 1A:
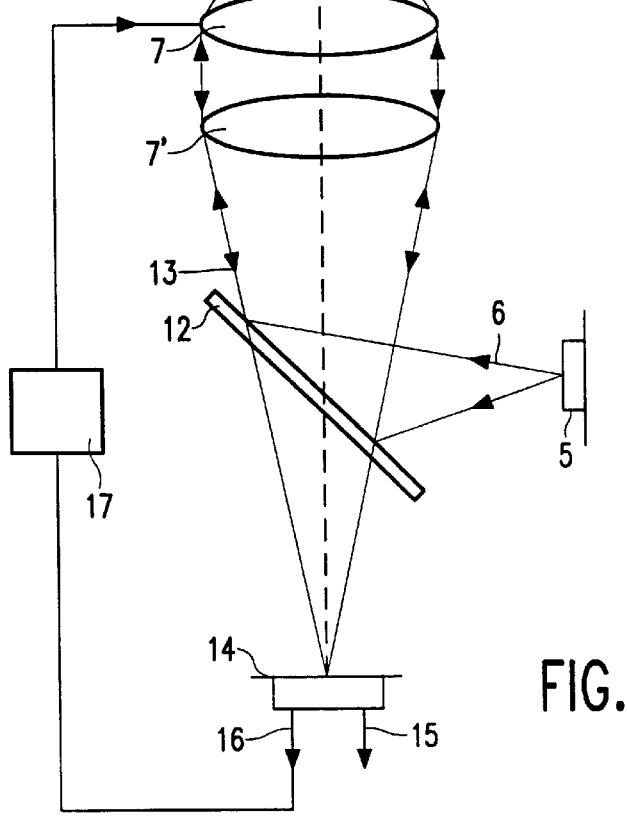
FIG. 1A shows a scanning device according to the invention scanning a record carrier of the first type.

Each of these rings may be arranged on either side of the objective lens or the collimator lens. This has the advantage that the ring is always properly aligned with respect to the lens system. The ring may also be arranged on the beam splitter 12 in FIG. 1A such that it does not interact with the radiation beam 6 from the laser 5 but only with the reflected radiation beam 11. When using a semi-transparent plate as beam splitter, as shown in FIG. 1A, the ring may be applied to the side of the plate directed towards the detection system 14. When the ring is arranged only in the reflected beam 11, the ring is preferably wider than the ring arranged on the lens, and runs preferably from 55% to 75% of the radius of the reflected beam at the location of the ring with a tolerance of ±5% of the mentioned radius. This arrangement has as an additional advantage that it yields a more robust read-out of information when a record carrier of the first type is tilted.

Figure 5:
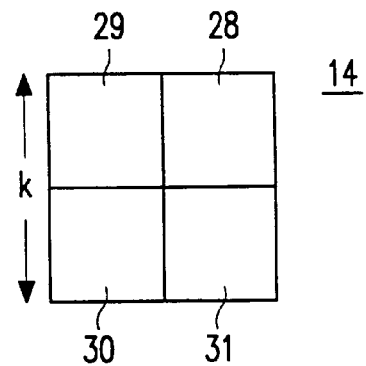
FIG. 5 shows a detection system of the scanning device.

FIG. 5 shows an embodiment of the detection system 14. The detection system comprises a quadrant detector having four radiation-sensitive detection elements 28, 29, 30 and 31. The radiation beam 11 incident on these elements has been made astigmatic, for instance by the passage through the oblique plate 12 shown in FIG. 1A. The four electric output signals of the detection elements may be used to form a focus error signal according to the so-called astigmatic method, known from inter alia U.S. Pat. No. 4,358,200. The size of the detector is used to discriminate between radiation in the central area and in the annular area of the incident beam as used for positioning the paraxial or the best focus on the information layer. On the one hand, the size of the elements must be large enough to capture most of the radiation beam when scanning a record carrier of the first type. On the other hand, the size must be sufficiently small not to intercept the marginal rays when scanning a record carrier of the second type. The compromise size of tile elements depends on the wavelength of the radiation, the numerical aperture $NA_D$ of the lens system on side of the detection system and the amount of astigmatism introduced in the radiation beam 11. The length k of one side of the detection system square lies preferably in a range from 0.6 times $k_{opt}$ to 1.4 times $k_{opt}$, where the optimum value for k, $k_{opt}$, is given by $$k = \frac{2(W_{22} + 1.5)\lambda}{NA_D} \quad (7)$$

where $W_{22}$ is the peak-valley astigmatic wavefront deformation expressed in units of the wavelength, introduced in the reflected beam 11 and measured over the entire cross-section of the beam. The tolerance on k implies that the detector shape is not limited to a square but may be rectangular within the tolerance range. A common amount of astigmatism introduced in the beam 11 is $5\lambda$. When $NA_D$ is equal to 0.1 and the wavelength equal to 650 nm, the length k lies preferably between 118 $\mu$m and 51 $\mu$m with an optimism value at 85 $\mu$m.

When no astigmatism is introduced in the radiation beam 11, the upper value of the preferred range for the size k of the detection system is given by $$k_{max} = 16W_{40}\left(\frac{NA_1}{NA_0}\right)^3 \frac{\lambda}{NA_D} \quad (8)$$

where $W_{40}$ is the spherical aberration due to a single pass through the thickness difference at the largest diameter of the radiation beam 11, i.e. at the numerical aperture $NA_0$, and $NA_1$ is the numerical aperture at the inner circle of the annular area of the radiation beam 9. The term $W_{40}$ is given in equation (2)

The lower value of the preferred range for k is 0.6 times $k_{max}$. In the objective lens 18 having a ring 27 extending from 0.55 to 0.65 times $r_0$, i.e. the diameter of the radiation beam, the value of $NA_1/NA_0$ is 0.65 and the maximum size of the detection system is given by $k_{max}=25\lambda/NA_D$. With the above values of $\lambda$ and $NA_D$ this yields $k_{max}=162$ $\mu$m and a lower bound of 97 $\lambda$m. The larger allowed size of the detection system when using an opaque ring is due to the suppression by the ring of rays at the transition from the central area to the annular area.

The magnitude of the astigmatisin $W_{22}$ is preferably such that $1.4 k_{opt} \leq k_{max}$.

A series of experiments has been conducted to show the quality of various signals derived from the detection system when using different lens systems in an optical scanning device. The thickness of the first transparent layer 2 of the first type of record carrier was 0.6 mm and that of the second transparent layer 22 of the second type of record carrier as 1.2 mm. The numerical aperture of the entire lens was 0.6. The information signal derived from the four output signals of the four detection elements 28–31 when scanning a record carrier of the first type had about the same quality when using a lens system without the opaque ring and when using a lens system having the opaque ring. This shows that the presence of the ring does not noticeably influence the quality of the information signal when reading record carriers of the first type.

When reading a record carrier of the second type using a lens system without the ring according to the invention the jitter in the information signal was about 8%. When using a lens system having a ring according to the invention, the jitter reduced to 6%.

The quality of the focus error signal depends strongly on the quality of the astigmatic focal lines formed by the radiation beam 11 near the detection system. The first embodiment of the lens system when scanning a record carrier of the second type gives a substantial improvement of the quality of the focal lines compared to the focal lines using an uncorrected lens system. The improved quality increases the capture range of the focus servo system and allows the use of larger detection elements, thereby improving the detection when reading record carriers of the second type. It also increases the positing tolerance of the detection system 14. In a specific scanning device using an uncorrected, known lens system a 10 $\mu$m position error of the detection system resulted in a focus offset of 2 $\mu$m. When using a corrected lens system in the same device having the 10 $\mu$m position error, the focus offset was less than 0.2 $\mu$m.

Although the invention has been described with reference to the scanning device shown in FIG. 1A, it will be clear that the opaque ring according to the invention can be used in any scanning device using the best and the paraxial focus, in particular the devices of the four classes described in the PCT application IB96/00182 referring to its FIGS. 1A, 2A, 2B, 3, 4, 5, 6 and 7. This application also provides a comprehensive account of the means for positioning the best and paraxial focus.

I claim:

1. Optical scanning device for scanning a first type of record carrier having a first information layer and a first transparent layer of a first thickness and for scanning a second type of record carrier having a second information layer and a second transparent layer of a second thickness different from the first thickness, the device comprising a radiation source for generating a radiation beam and a lens system designed for converging the radiation beam through the first transparent layer to a focus on the first information layer, a detection system arranged in a radiation beam reflected from the record carrier, an opaque annular ring arranged in the optical path between the radiation source and the detection system, and means for positioning the best focus of the radiation beam substantially on the first information layer and the paraxial focus of said radiation beam substantially on the second information layer wherein said annular ring is defined by an inner circle and an outer circle, said inner circle having a radius which lies in a range from $0.75r_1$ to $1.25r_1$, where $r_1$ is given by $$r_1 = \frac{r_0}{NA_0} \sqrt[4]{\frac{4\lambda n^3}{\Delta d(n^2 - 1)}}$$

where $\lambda$ is the wavelength of the radiation beam, n is the refractive index of the second transparent layer, $\Delta d$ the difference between the first thickness and the second thickness, $r_0$ the radius of the radiation beam at the location of the ring and $NA_0$ the numerical aperture of the radiation beam converged by the lens system.

2. Optical scanning device according to claim 1, wherein the ring is arranged in the radiation beam from the radiation source to the record carrier and in a radiation beam from the record carrier, the ring having a width in the range from 0.05 $r_0$ to 0.25 $r_0$.

3. Optical scanning device according to claim 1, wherein the ring is arranged only in a radiation beam from the record carrier, the ring having a width in the range from 0.15 $r_0$ to 0.25 $r_0$.

4. Optical scanning device as in claim 1 wherein the inner circle has a radius which is equal to $r_1$.

5. Method for optically scanning a first type of record carrier having a first information layer and a first transparent layer of a first thickness and a second type of record carrier having a second information layer and a second transparent layer of a second thickness different from the first thickness, comprising the step of converging a radiation beam by means of a lens system through the first transparent layer to a best focus substantially on the first information layer when scanning a record carrier of the first type, the step of converging the radiation beam by means of the lens system through the second transparent layer to a paraxial focus substantially on the second information layer when scanning a record carrier of the second type, the step of converging radiation reflected from the record carrier to a detection system, and the step of preventing part of the reflected beam from reaching the detection system by an opaque annular ring arranged in the optical path between the radiation source and the detection system said ring having an inner radius in the range from $0.75r_1$ to $1.25r_1$, where $r_1$ is given by $$r_1 = \frac{r_0}{NA_0} \sqrt[4]{\frac{4\lambda n^3}{\Delta d(n^2 - 1)}}$$

where $\lambda$ is the wavelength of the radiation beam, n is the refractive index of the second transparent layer, $\Delta d$ the difference between the first thickness and the second thickness, $r_0$ the radius of the radiation beam at the location of the ring and $NA_0$ the numerical aperture of the radiation beam converged by the lens system.

6. Method according to claim 5, comprising the step of forming a best focus error signal from radiation in at least an annular outer area of the cross-section of a beam of radiation reflected from the record carrier when scanning a first type of record carrier, and the step of forming a paraxial focus error from radiation mainly in a central area within the annular outer area when scanning a second type of record carrier, and the step of controlling the position of the lens system in response to the best focus error signal when scanning a record carrier of the first type and in response to the paraxial focus error when scanning a record carrier of the second type.

7. Method according to claim 5, comprising the step of generating an information signal from radiation in substantially the entire cross-section of a beam of radiation reflected from the record carrier when scanning a record carrier of the first type, and the step of generating an information signal from radiation in a central area of said cross-section when scanning a record carrier of the second type.

8. Method as in claim 5 wherein said ring is arranged in the radiation beam from the radiation source to the record carrier and in the radiation beam reflected from the record carrier to the detection system.

9. Method as in claim 5 wherein the inner circle has a radius which is equal to $r_1$.

* * * * *